US012577987B2

(12) United States Patent
Bertolini et al.

(10) Patent No.: US 12,577,987 B2
(45) Date of Patent: Mar. 17, 2026

(54) BEARING UNIT WITH OPTIMIZED CLAMPING DEVICE

(71) Applicant: AKTIEBOLAGET SKF, Gotenborg (SE)

(72) Inventors: Andrea A. Bertolini, Carrara (IT); Fausto Baracca, Massa (IT); Alessio Nebbia Colomba, Pisa (IT); Pasquale Frezza, Aversa (IT)

(73) Assignee: Aktiebolaget, SKF, Gothenburg (SE)

( * ) Notice: Subject to any disclaimer, the term of this patent is extended or adjusted under 35 U.S.C. 154(b) by 411 days.

(21) Appl. No.: 18/168,611

(22) Filed: Feb. 14, 2023

(65) Prior Publication Data

US 2023/0265890 A1    Aug. 24, 2023

(30) Foreign Application Priority Data

Feb. 21, 2022    (IT) ......................... 102022000003107

(51) Int. Cl.
F16C 19/16          (2006.01)
F16C 23/08          (2006.01)
F16C 35/073         (2006.01)
(52) U.S. Cl.
CPC ............ F16C 35/073 (2013.01); F16C 19/16 (2013.01); F16C 23/084 (2013.01); F16C 2226/16 (2013.01)
(58) Field of Classification Search
CPC ........ F16C 19/06; F16C 19/16; F16C 23/084; F16C 35/075; F16C 2226/16; F16C 2226/60
See application file for complete search history.

(56) References Cited

U.S. PATENT DOCUMENTS

| | | | | |
|---|---|---|---|---|
| 1,251,449 | A | * 12/1917 | Vorraber | ............... F16C 35/073 403/370 |
| 5,330,284 | A | 7/1994 | Persson | |
| 2006/0093251 | A1* | 5/2006 | Casey | .................... F16D 1/096 384/538 |

(Continued)

FOREIGN PATENT DOCUMENTS

| | | |
|---|---|---|
| DE | 355441 | 6/1922 |
| DE | 8025562 | 9/1981 |

(Continued)

OTHER PUBLICATIONS

DE355441C_Description.*
International Search Report for corresponding Italy Patent Application No. 102022000003107 dated Oct. 6, 2022.

*Primary Examiner* — Phillip A Johnson
(74) *Attorney, Agent, or Firm* — Stinson LLP

(57)            ABSTRACT

A bearing unit configured to be clamped on a machine shaft includes a stationary radially outer ring, a rotatable radially inner ring having a radially inner surface, a row of rolling bodies interposed between the radially outer ring and the radially inner ring, and a clamping device that includes a clamping sleeve between the radially inner ring and the machine shaft, the clamping sleeve including a threaded flange portion and a circumferential slit configured to deform and tighten around the machine shaft, and a ring nut to screw onto the threaded flange portion and exert an axial force on the radially inner ring, the radially inner surface of the radially inner ring engages the radially outer surface of the clamping sleeve.

16 Claims, 2 Drawing Sheets

(56)         References Cited

U.S. PATENT DOCUMENTS

2012/0237152 A1 *  9/2012  Wheals ................. F16C 35/078
                                                          384/548

FOREIGN PATENT DOCUMENTS

DE       10161066 A1 *  8/2002  ............ F16C 35/073
EP         324324 A  *  7/1989  ............ F16C 35/063
EP        0967404      12/1999
FR        1142874       9/1957
GB         778607 A  *  7/1957
GB        2120360 A  * 11/1983  ............ F16C 35/073

* cited by examiner

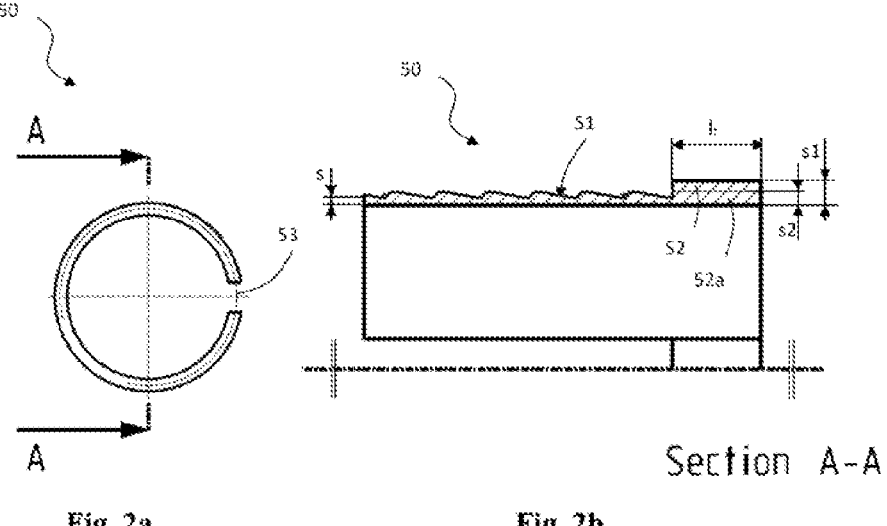
Fig. 2a                    Fig. 2b
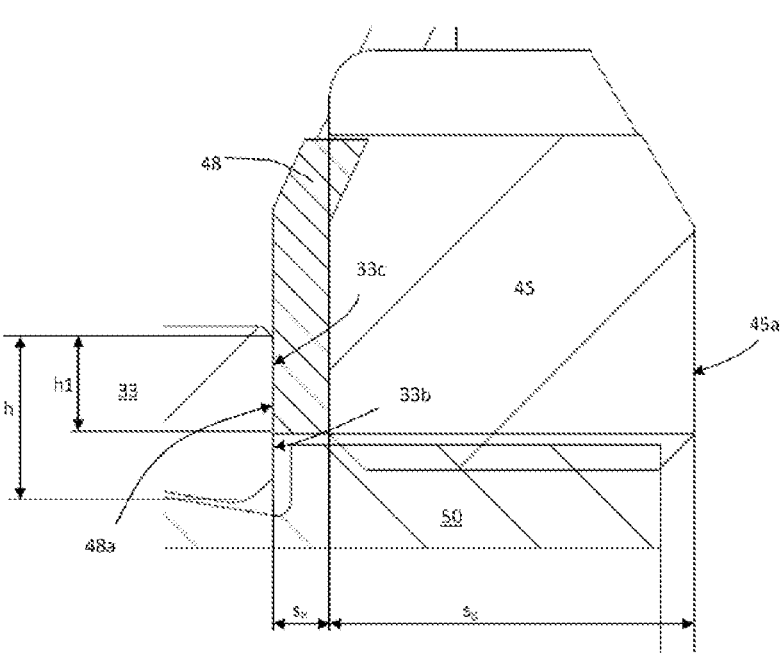
Fig. 3 - Detail B

BEARING UNIT WITH OPTIMIZED CLAMPING DEVICE

CROSS-REFERENCE TO RELATED APPLICATIONS

This application is based on and claims priority to Italian Patent Application No. 102022000003107 filed on Feb. 21, 2022, under 35 U.S.C. § 119, the disclosure of which is incorporated by reference herein.

FIELD

The present disclosure relates to a bearing unit provided with a device for performing optimized clamping onto a rotating shaft of a machine for applications in the manufacturing industry. In particular, the bearing unit incorporates a bearing with a single row of balls, i.e. a so-called "deep groove" bearing, which is sealed off from the external environment and contained inside a hole of an external housing.

BRIEF DESCRIPTION OF THE DRAWINGS

The disclosure will now be described with reference to the attached drawings which illustrate exemplary embodiments of a housing element, in which:

FIG. 2a shows a side view of a clamping sleeve of the clamping device of FIG. 1 according to an exemplary embodiment;

FIG. 2b is a longitudinally sectioned view of the clamping sleeve of the clamping device shown in FIG. 1 according to an exemplary embodiment of the present disclosure; and FIG. 3 is detail view of the clamping device shown in FIG. 1 according to an exemplary embodiment of the present disclosure.

DETAILED DESCRIPTION

Figure 1:
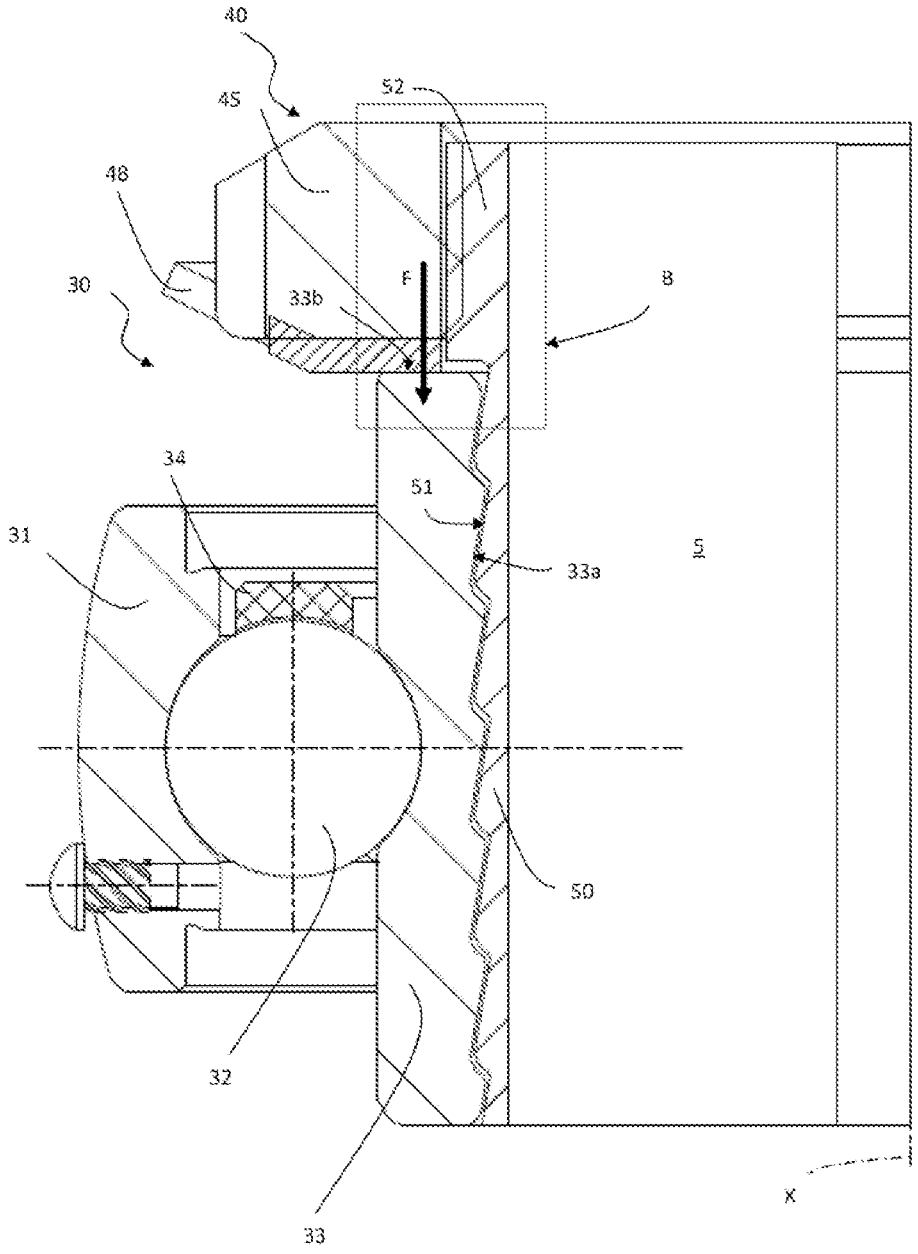
FIG. 1 shows a cross-section of a bearing unit provided with a clamping device according to an exemplary embodiment of the present disclosure.

Bearing units are provided with rolling bodies to allow the relative movement of a component or group with respect to another component or group. The bearing unit generally has a first component, for example a radially outer ring, that is fixed to a stationary element, and a second component, for example a radially inner ring, that is fixed to a rotating element. The rotation of one ring with respect to the other ring is allowed by a plurality of rolling bodies positioned between a cylindrical surface of the first component and a cylindrical surface of the second component, normally called raceways. The rolling bodies may be balls, cylindrical or tapered rollers, needle rollers, or similar rolling bodies.

Depending on the specific application for which the bearing unit may be used, different devices for clamping the bearing unit onto a machine shaft have been defined. Examples of known clamping devices include a locking collar with a stop screw and an adapter sleeve that couples the bearing unit to the machine shaft with a suitable interference fit.

In particular, a known bearing unit solution as described in European Patent EP 0,967,404 B1, which is hereby incorporated by reference in its entirety. As discussed, a bearing unit can be a concentric bearing unit in which the device for clamping the bearing unit on the machine shaft is concentric both with the bearing unit and with the shaft. This solution offers good performance results in terms of permissible axial load that does not cause any displacement of the radially inner ring, and therefore the bearing unit, relative to the machine shaft.

The clamping device of this concentric solution is provided with three screws that are arranged at 120° circumferentially and are tightened so as to clamp a sleeve, ensuring locking of the radially inner ring on the shaft. This assembly procedure, however, takes too long. This explains why this concentric solution, although providing excellent performance, has hitherto not enjoyed the commercial success it deserves. Furthermore, the consequent low volumes prevent a correct economy of scale and this further penalizes the final cost of the product.

There exist other bearing units—for example conical hole bearing units—which are provided with simpler clamping devices since they use only one nut and have corresponding assembly times of less than one minute. However, these bearing units do not manage to ensure the performance provided by the concentric bearing unit.

There therefore exists the need to define a concentric bearing unit provided with a clamping device that achieves a satisfactory clamp to secure the bearing unit to the machine shaft while also providing for quick and easy assembly.

An object of this disclosure is to provide an easy to assemble clamping device for a bearing unit that securely clamps the bearing unit onto a machine shaft with high load performance.

As used herein, the words "may" and "can" are used in a permissive sense (i.e., meaning having the potential to) rather than the mandatory sense (i.e., meaning must). Similarly, the words "include," "including," and "includes" mean including, but not limited to.

FIG. 1 illustrates an exemplary embodiment of a bearing unit provided with a clamping device. In particular, a bearing unit 30 may include a radially outer ring 31 that is rotatable about a central axis of rotation X of bearing unit 30, a stationary radially inner ring 33, a row of rolling bodies 32 interposed between radially outer ring 31 and inner ring 33, and a cage 34 for containing rolling bodies 32 in position. Rolling bodies 32 can be balls, needle rollers, or the like.

In the whole of the present description and in the claims, the terms and the expressions indicating positions and orientations such as "radial" and "axial" are understood as referring to central axis of rotation X of bearing unit 30.

For the sake of simpler graphical illustration, reference number 32 will be attributed both to the individual rolling bodies of the row of rolling bodies and to the row of rolling bodies.

Furthermore, it will be appreciated by a person of skill in the art that, while described herein as stationary, inner ring 33 may alternatively be a rotating ring, and outer ring 31 may be stationary without departing from the scope and spirt of this disclosure.

Bearing unit 30 may also be provided with one or more sealing devices (not illustrated) for sealing off the bearing unit from the external environment to prevent entry of contaminants.

Bearing unit 30 is provided with an optimized clamping device 40 that includes a camping sleeve 50 and a single ring nut 45 for fixing radially inner ring 33 onto clamping sleeve 50, which is in turn also clamped onto a machine shaft 5.

Radially inner ring 33 includes a radially inner surface 33a that, when assembled, aligns with a radially outer surface 51 and clamping sleeve 50. These two surfaces 33a and 51 are oppositely arranged surfaces and form the surfaces for clamping radially inner ring 33 and clamping sleeve 50 together. Surfaces 33*a* and 51 are both designed with a saw-tooth profile in longitudinal section that mate together. By using this saw-tooth profile to provide the clamping surfaces, an overall radial dimension of bearing unit 30 can be reduced, which is beneficial to implementations requiring use of a bearing unit in a small radial space.

FIGS. 2*a* and 2*b* illustrate varying views of clamping sleeve 50 of clamping device 40 of FIG. 1. Clamping sleeve 50 is provided with a threaded flange portion 52 at a first end that engages with ring nut 45. Clamping sleeve 50 has a circular cross-section and includes a circumferential slit 53.

Ring nut 45 is screwed onto threaded flange portion 52 of clamping sleeve 50 and axially interposed between ring nut 45 and radially inner ring 33 by a disc-shaped elastic element 48. Ring nut 45 exerts a force "F" in an axial direction (illustrated by the axial arrow in FIG. 1) on radially inner ring 33. The force "F" exerted by ring nut 45 on radially inner ring 33 results in contact between radially inner surface 33*a* of radially inner ring 33 and radially outer surface 51 of clamping sleeve 50. Consequently, radially inner ring 33 clamps clamping sleeve 50, which, in turn and resulting from the presence of circumferential slit 53, may be deformed and tightened around machine shaft 5. In this way, a "concentric" clamping is achieved between bearing unit 30 and clamping sleeve 50. A greater force imparted by ring nut 45 results in a greater clamping force provided between radially inner ring 33 and sleeve 50 and between sleeve 50 and shaft 5. This produces a greater overall resistance in terms of a permissible axial load.

In order to increase the overall resistance to axial loads, and therefore be able to increase an axial force, such as force "F," that can be exerted by ring nut 45, a radial dimension of an axial surface 33*b* of radially inner ring 33 can be increased and be larger than known solutions. From test results, an increase of between 200% and 300% is more than satisfactory to achieve an improved clamping force. For example, as illustrated in FIG. 3, a radial length "h" of axial surface 33*b* may be 1.2 mm to 2.95 mm, which represents an increase of about 250% from known solutions. A second radial length "h1" of an axial surface portion 33*c* of radially inner ring 33 and of surface portion 48*a* of the elastic element 48 that represent the contacting portions of radially inner ring 33 and elastic element 48 can be greater than half the radial height h of the entire axial surface 33*b* of the radially inner ring 33. In other words, these contact surfaces may be more than half a radial thickness of radially inner ring 33.

Clamping sleeve 50 can have a radial thickness s1 at flange portion 52 that is greater than an average radial thickness "s" of clamping sleeve 50 because flange portion 52 may include threading that engages with ring nut 45. Advantageously, to prevent excessively weakening flange portion 52, a radially inner part 52*a* of flange portion 52, which does not have any threading, may have a radial thickness s2 no less than ⅓ of radial thickness s1 of flange portion 52. For example, an advantageous thickness s1 of flange portion 52 is 3 mm, and consequently an advantageous thickness s2 will be greater than 1 mm.

Furthermore, an axial length "lf" representing an axial length of the threading of threaded flange portion 52 may be at least 90% of the sum of an axial thickness "se" of elastic element 48 and of an axial thickness "sg" of ring nut 45. In this way, during assembly when ring nut 45 is screwed onto clamping sleeve 50, an end portion 45*a* of ring nut 45 is engaged with the threading of threaded flange portion 52 of clamping sleeve 50.

At the same time, axial length lf of the threading of clamping sleeve 50 may be below 100% of a sum of axial thickness se of elastic element 48 and axial thickness sg of ring nut 45, in order to limit an overall axial dimension of clamping device 40.

By defining a concentric bearing unit that is provided with a clamping device that uses only one ring nut and a clamping sleeve as described above, the clamping device is simple to assemble and provides high permissible axial load performance.

Therefore, in accordance with the principles of the present disclosure, the bearing unit is provided with an innovative device for performing clamping onto the machine shaft, which is simple and reliable at the same time. In fact, on the one hand an excellent performance in terms of permissible axial load is ensured and, on the other hand, a major reduction in the assembly procedure time is achieved.

In addition to the embodiments of the disclosure, as described above, it is to be understood that numerous further variants exist. It may also be understood that said embodiments are only examples and limit neither the scope of the disclosure, nor its applications, nor its possible configurations. On the contrary, although the description provided above enables the person skilled in the art to implement the present disclosure at least in one of its examples of configuration, it may be understood that numerous variations of the components described are feasible, without thereby departing from the scope of the disclosure, as defined in the accompanying claims, interpreted literally and/or in accordance with their legal equivalents.

We claim:

1. A bearing unit configured to be clamped on a machine shaft, the bearing unit comprising:
   a stationary radially outer ring;
   a radially inner ring comprising a radially inner surface, wherein the radially inner ring is rotatable about an axis of rotation of the bearing unit;
   a row of rolling bodies interposed between the radially outer ring and the radially inner ring;
   a clamping device configured to clamp the bearing unit to the machine shaft, the clamping device comprising:
      a clamping sleeve configured to be radially interposed between the radially inner ring and the machine shaft, the clamping sleeve comprising:
         a threaded flange portion; and
         a circumferential slit configured to deform and tighten around the machine shaft;
      a ring nut configured to screw onto the threaded flange portion and exert an axial force on the radially inner ring; and
      a disc-shaped elastic element configured to be axially interposed between the ring nut and the radially inner ring;
   wherein the radially inner surface of the radially inner ring is arranged to engage a radially outer surface of the clamping sleeve when the clamping device clamps the bearing unit to the machine shaft;
   wherein a radial length of a contacting portion of the radially inner ring and a radial length of a contacting portion of the elastic element are greater than half of a radial length of an axial surface of the radially inner ring, wherein the contacting portion of the radially inner ring is configured to contact the contacting portion of the elastic element when the clamping device clamps the bearing unit to the machine shaft.

2. The bearing unit of claim 1, wherein the radially inner surface of the radially inner ring and the radially outer surface of the clamping sleeve each comprise a saw-tooth profile in a longitudinal cross-section configured to mate together.

3. The bearing unit of claim 2, wherein the threaded flange portion of the clamping sleeve comprises a radial thickness greater than an average overall radial thickness of the clamping sleeve.

4. The bearing unit of claim 1, wherein the threaded flange portion of the clamping sleeve comprises a radial thickness greater than an average overall radial thickness of the clamping sleeve.

5. The bearing unit of claim 1, wherein a radial thickness of a threadless radially internal part of the flange portion is not less than ⅓rd of a radial thickness of the flange portion.

6. The bearing unit of claim 1, wherein an axial length of the thread of the clamping sleeve is between 90% and 100% of the sum of an axial thickness of the elastic element and an axial thickness of the ring nut.

7. The bearing unit of claim 1, wherein the disc-shaped elastic element includes a radial portion and an angled portion, the radial portion configured to be axially interposed between the ring nut and the radially inner ring, the angle portion extending axially and radially outward from the radial portion.

8. The bearing unit of claim 1, wherein the clamping sleeve includes a cylindrical body, the threaded flange portion of the clamping sleeve being integrally formed with the cylindrical body.

9. The bearing unit of claim 1, wherein the radial length of the contacting portion of the radially inner ring and the radial length of the contacting portion of the elastic element are greater than half of a radial thickness of the radially inner ring.

10. The bearing unit of claim 1, wherein the ring nut is configured to be axially spaced apart from the radially inner ring when the clamping device clamps the bearing unit to the machine shaft.

11. The bearing unit of claim 10, wherein a radial thickness of a threadless radially internal part of the flange portion is not less than ⅓rd of a radial thickness of the flange portion.

12. The bearing unit of claim 11, wherein an axial length of the thread of the clamping sleeve is between 90% and 100% of the sum of an axial thickness of the elastic element and an axial thickness of the ring nut.

13. The bearing unit of claim 12, wherein the disc-shaped elastic element includes a radial portion and an angled portion, the radial portion configured to be axially interposed between the ring nut and the radially inner ring, the angle portion extending axially and radially outward from the radial portion.

14. The bearing unit of claim 13, wherein the clamping sleeve includes a cylindrical body, the threaded flange portion of the clamping sleeve being integrally formed with the cylindrical body.

15. The bearing unit of claim 14, wherein the radial length of the contacting portion of the radially inner ring and the radial length of the contacting portion of the elastic element are greater than half of a radial thickness of the radially inner ring.

16. The bearing unit of claim 15, wherein the ring nut is configured to be axially spaced apart from the radially inner ring when the clamping device clamps the bearing unit to the machine shaft.

* * * * *